July 8, 1969     H. L. DOBRIKIN     3,454,034
TIRE PRESSURE SYSTEM
Filed June 21, 1966
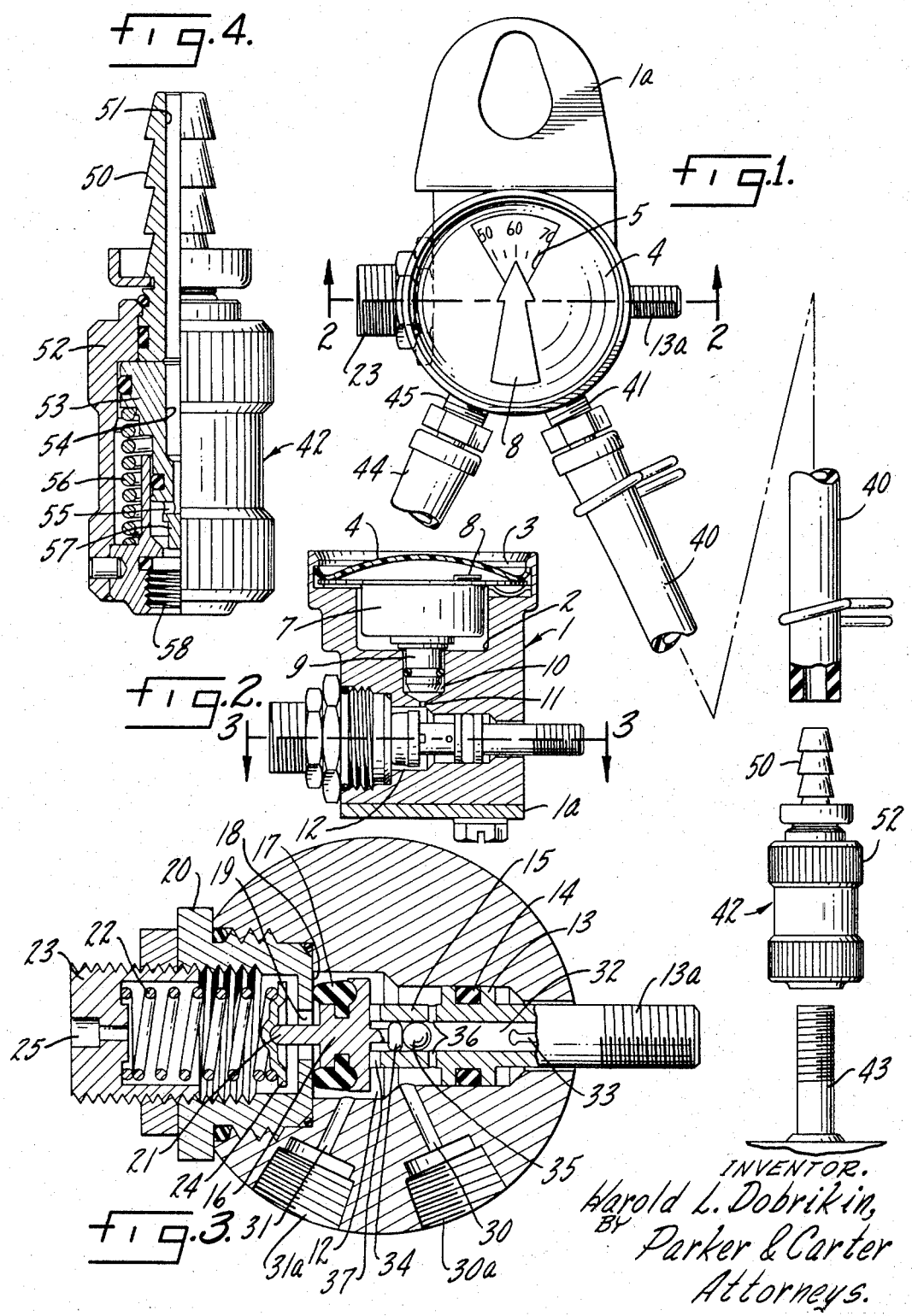
INVENTOR.
Harold L. Dobrikin,
BY Parker & Carter
Attorneys.

United States Patent Office 3,454,034
Patented July 8, 1969

1

3,454,034
TIRE PRESSURE SYSTEM
Harold L. Dobrikin, Highland Park, Ill., assignor to Berg Mfg. & Sales Co., Des Plaines, Ill., a corporation of Illinois
Filed June 21, 1966, Ser. No. 559,321
Int. Cl. F16k 15/20, 37/00
U.S. Cl. 137—228                         7 Claims

ABSTRACT OF THE DISCLOSURE

A pressure system for a dual tire set operable to maintain a pressure balance between the tires above a predetermined minimum pressure wherein a valve housing is provided with a plenum chamber having a plunger slidable therein, said plunger having a bore extending axially therethrough with a tire filling valve in one end and radially extending ports in the other end. A ball member is movably positioned in the bore to coact with the bore and ports to provide for relatively quick inflation and slow deflation of said tires. An exhaust passage is provided in said housing and is controlled by a biased open exhaust valve, which is moved to closed position by engagement therewith of said plunger at pressures above a predetermined minimum. Passages are provided in the housing communicating the plenum chamber with the tires. Conduits connecting the passages with the tires each have a protection valve therein which maintains its associated tire valve open by engagement therewith so long as pressure in the system is above a predetermined minimum but which moves out of engagement with its associated tire valve allowing that valve to close when the pressure in the system falls below said minimum thereby disrupting communication between the tires. At pressures below said minimum the exhaust valve is opened by its biasing means thereby establishing atmospheric pressure in the plenum chamber which is indicated on a gauge associated therewith.

This invention relates to vehicle tire pressure systems and has particular relation to dual-tire installations.

One purpose of the invention is to provide a tire pressure system effective to retain pressure in one tire of a set of tires when pressure is depleted below a predetermined amount in the other tire of said set of tires.

Another purpose is to provide a tire pressure system including a gauge in communication with both tires of a dual-tire set with means insuring reflection of the lowest pressure in said set of tires.

Another purpose is to provide a tire pressure system including a gauge in communication with both tires of a dual-tire set and including means insuring reflection in said gauge of zero pressure when pressure is entirely lost in one tire of said set.

Another purpose is to provide a tire gauge having valve means effective to insure exhaust of fluid pressure upon diminution of pressure in one tire of a dual set of tires below a predetermined amount.

Another purpose is to provide a tire pressure system and gauge having means insuring closure of exhaust means upon initial application of fluid pressure to the tires in communication with said gauge.

Another purpose is to provide a tire pressure system having means providing for rapid delivery of fluid pressure to the tires in communication in said system and for insuring restricted outflow of fluid pressure from said system.

Another purpose is to provide a tire pressure system including a gauge in communication with both tires of a dual set of tires, valve means associated with each of said tires to insure against the loss of pressure to said system

2 from either of said tires below a predetermined amount and an adjustable exhaust valve effective to exhaust the remainder of said system when the pressure in the other of said tires falls below a predetermined amount.

Another purpose is to provide a tire pressure system including a gauge member and chamber in communication with both tires of a dual tire set to maintain pressure equalization in both tires, as long as the pressure is above some predetermined level.

Other purposes will appear from time to time during the course of the specification and claims.

The invention is illustrated more or less diagrammatically in the accompanying drawings, wherein:

FIGURE 1 is a partial plan view with parts broken away;

FIGURE 2 is a view taken on the line 2—2 of FIGURE 1;

FIGURE 3 is a view in partial cross section taken on the line 3—3 of FIGURE 2; and FIGURE 4 is a side view with parts in cross section of a valve part of the system.

Like parts are indicated by like numerals throughout the specification and drawings.

Referring now to the drawings, the numeral 1 generally indicates a housing. The housing 1 has a well 2 formed therein. The well 2 opens upwardly into the expanded open upper end 3 of window 5 therein and a fixed indicia arrow thereon. Positioned in well 2 is a pressure gauge element 7 which may conveniently include a conventional Bourdon tube, the structure and operation of which are so well known as not to require illustration or detail description herein. An indicating arrow 8 is secured to the distal end of such a tube for movement beneath the cover 4 and across the window 5. It will be understood that variances in fluid pressure entering one end of the Bourdon tube spiral-like coil of the member 7 vary the diameter of said coil and produce a consequent movement of the arrow 8. A restricted passage 11 communicates with the passage 10 for delivery of fluid pressure to fitting 9 for consequent delivery to the Bourdon tube structure within member 7.

Passage 11 communicates with a plenum chamber 12 formed in housing 1. Slidable in one end portion of chamber 12 is a plunger 13 carrying the seal 14 in engagement with the inner wall of said one end segment of chamber 12. A reduced inner end portion 15 of plunger 13 is positioned for contact with an exhaust control valve 16 movably positioned in plenum chamber 12 and carrying the valve element 17 for seating upon a valve seat 18 positioned at one end of chamber 12. The seat 18 surrounds an exhaust passage 19 formed in one end of a plug 20 rotatably secured in housing 1. The valve member 16 includes a finger extension 21 extending through the passage 19. A yielding member, such as the spring 22, is held within plug 20 by adjustable spring retainer member 23 threadably engaged with plug 20. The spring 22 urges a cap 24 against the finger 21. The exhaust passage 19 feeds through the chamber formed by the areas within plug 20 and adjustable member 23 and communicates therethrough with exhaust passage 25 open to atmosphere. Branch passages 30, 31 are formed and positioned in housing 1 to communicate with plenum chamber 12 between valve seat 18 and seal 14 and to communicate also with threaded sockets 30a, 31a, respectively.

The plunger member 13 has axial passage 32 extending throughout its length and includes the external portion 13a extending beyond the housing 1. A conventional, well known filler valve 33 is carried within the outer end portion 13a of plunger 13.

Valve member 16 includes a positioning finger extension 34 slidable within the inner end portion of passage 32 in plunger member 13. A ball member 35 is freely positioned in passage 32 between finger extension 34 and filler valve member 33. Radially directed openings 36 are formed in plunger portion 15 between its inner end and the seal 14 and communicate passage 32 with plenum chamber 12. Similar openings 37 are formed at the inner end of plunger portion 15.

A conduit 40 has one of its ends secured within socket 30a as indicated at 41. The opposite end of conduit 40 is secured to and communicates with a tire-protecting valve member 42 which is in turn secured to the filler neck of one tire of a dual set of tires, such a filler neck being shown, for example, at 43. It will be understood that a second conduit 44 is similarly secured, as indicated at 45, in socket 31a and communicates with a valve corresponding to valve 42 which is in turn secured to a filler neck of the other tire of said dual set of tires.

As illustrated in FIGURE 4, the valve 42 includes a fitting 50 having axial passage 51 therethrough, the fitting 50 being secured to and communicating with the conduit 40 or 44. Fitting 50 is secured to a valve housing 52 within which a shuttle 53 is reciprocally mounted. The shuttle 53 has an axial passage 54 and branch passage 55 to communicate the passage 51 with the area within a tire when the shuttle 53 is moved downwardly against the action of spring 56 to cause the finger extension 57 on shuttle 53 to contact and open the conventional filler valve of the tire (not shown) within the filler neck such as that shown at 43, the threaded portion 58 being provided for engagement with the threads of a neck such as that shown at 43. For a more complete understanding and description of the tire protection valve shown in FIGURE 4, reference may be had to copending application, Ser. No. 398,616, now Patent No. 3,249,144, filed Sept. 23, 1964, for Tire Valve.

The use and operation of the invention are as follows:

The housing 1, it will be understood, is suitably secured as by the bracket 1a, for example, to the outer visible surface of the outer wheel of a dual set of wheels. A valve 42 is secured to a filler neck 43 of each of the tires and the conduits 40, 44 communicate the valves 42 with the housing 1. The indicia shown beneath the window 5 in FIGURE 1 has been set to indicate the desired tire pressure for both tires of the dual set. Air pressure is initially supplied to the tires by connecting a source of air pressure to the external portion 13a of plunger 13. The operator making such connection presses inwardly on the plunger 13 in depressing the filler valve 33 and perhaps a corresponding valve in the air pressure source conduit. Inward pressure on the plunger 13 presses it against member 16 and insures a mechanical seating of the valve 17 on the seat 18 against the action of spring 22. Air pressure thus delivered through passage 32 flows about the ball 35 and through outlets 36 to the plenum chamber 12. Pressure then flows from plenum chamber 12 through both conduits 40, 44 to move the shuttles 53 in the valves 42 and consequently the finger portions 57 against the filler valves of the tires. Pressure then flows from the conduits 40, 44 through the passages 54, 55 into the tires to fill them to the desired level. The pressure in chamber 12 also operates against the inner face of the enlarged portion of plunger 13, which sealingly and slidably engages the wall of chamber 12, to move plunger 13 outwardly. Air pressure in chamber 12 also flows through restricted passage 11 into the fitting 9 and gauge housing 7 for entry into the one open end of the Bourdon tube therein to cause expansion thereof and a consequent movement of the pointer 8 which is secured to the opposite closed end of the Bourdon tube (not shown). Thus the pointer 8 will move beneath the window 5 to indicate the pressure in both tires of the dual set. When the desired pressure has been reached, the air pressure source is disconnected from the external portion 13a of plunger 13.

Should the operator wish to discharge excess pressure from the system, inward pressure on the filler valve 33 is effective to open the passage 32 to atmosphere. The ball 35 is moved beyond the openings 36 by the flow of said fluid pressure and restricts the outward flow of pressure through passage 32 to provide for minute adjustments of the air pressure.

Upon diminution of pressure in either tire, the excess pressure from the other tire is free to and will flow through its associated conduit, the plenum chamber 12 and the conduit associated with the depleted tire to equalize the pressure between the tires. Since the thus equalized pressure will be present in chamber 12, it will also be reflected by the pointer 8.

Should the pressure of one tire, however, fall beneath a predetermined minimum desired or safe level, means are provided to insure against depletion of the other, "good" tire below such level. The yielding means 56 of the valve 42 associated with the good tire is effective against shuttle 53 therein to return that shuttle 53 to the position shown, for example, in FIGURE 4, thus releasing the finger 57 from the filler valve of said good tire to close further communication of said good tire with the system.

Thus the "good" tire will be retained at a predetermined reduced, yet safe, pressure. This is true even if the companion tire has been depleted of all air pressure. The pressure in the system will be communicated to plenum chamber 12 and to pointer 8 and thus will be readily apparent to the operator. If one tire be diminished and pressure be transferred from the other tire, as above described, the new, equalized pressure will then be reflected by pointer 8. If said pressure in plenum chamber 12 be reduced below a predetermined amount, the spring 22 operating against cap 24 and finger 21 of exhaust control valve 16 is effective to unseat the valve 16 and thereby to exhaust plenum chamber 12, as well as the conduits communicating with both tires and to cause the pointer 8 to reflect the resulting reduced or zero pressure in chamber 12. As shown, for example, the pointer 8 would disappear from view through window 5, though it will be understood that the indicating indicia employed may vary without departing from the nature and scope of the invention.

Absent the exhaust feature just described, a loss of pressure below a predetermined safe value in one tire, with the resultant closing of the valves 42 of both tires, would produce the entrapment of pressure in conduits 40, 44 and in chamber 12 which would be reflected by pointer 8 to give a misleading indication that both tires contained said pressure, the thus entrapped pressure being at a substantial level just below that necessary to open a valve 42 against means 56.

In a system such as that just described, it will be realized that the controlling element would be the relationship between shuttles 53 of the valves 42 and the springs 56. That relationship would be pre-set to cause closure of valves 42 at the minimum desired level of tire pressure. Since such desired levels vary among trailer users, a different setting and consequently a number of sizes of valves 42 would have to be manufactured, cataloged and inventoried. A change in desired pressure level by a particular trailer user would require replacement of the valves 42 on all tires involved in the change.

With the system of the present invention, a standard valve 42 may be manufactured, cataloged and inventoried. Such valves may be set to close at a predetermined pressure level such as to encompass any and all anticipated levels in the field of use. If the range of potentially desired levels be excessive, two models of the valve 42 may be supplied, but, in any event, the members of such valves may be greatly reduced and the valves standardized.

If a trailer user then desires to produce an "unsafe" indication at a pressure level different from that pre-set in the standardized valves 42, the user merely adjusts the tension or force of spring 22 by rotating adjustable retainer 23 inwardly or outwardly of plug 20. Thereafter, the system will be exhausted by unseating of valve 17 whenever the pressure in chamber 12 falls below that sufficient to resist the effect of spring 22 and the result will be indicated by pointer 8. When the pressure in chamber 12 fell below the amount sufficient to hold shuttles 53 open, the same will have closed to preclude further loss of pressure from the tires to chamber 12 and to protect the "good" tire or tires from further loss of pressure. Similarly, should there be a leak, break or separation of one of the conduits 40, 44, the resulting loss of pressure will be reflected in chamber 12, pressure will flow from a good tire or tires to replenish chamber 12 and valves 17 and 42 will, respectively, open and close at their pre-set pressure values to exhaust chamber 12 and protect the good tire or tires against further loss of pressure.

There is claimed:

1. A pressure system for a dual tire set, including a housing, a plenum chamber in said housing, a pressure gauge member in communication with an operable in response to pressure within said plenum chamber, a pair of protection valves, each of said valves communicating with one tire in said set, each of said valves being yieldingly urged toward closed position, a pair of pressure conduits, each of said conduits communicating one of said protection valves with said plenum chamber, each of said protection valves being set to close automatically upon diminution of pressure in its associated conduit below a predetermined level, an exhaust passage communicating with said plenum chamber, and a control valve positioned in said plenum chamber to close said exhaust passage in response to pressure in said chamber above a predetermined level, and including a plunger member slidably mounted in said chamber for movement in one direction toward and into operating contact with said control valve to urge said control valve toward closed position.

2. The structure of claim 1 characterized by and including an air passage through said plunger member, said air passage communicating adjacent one of its ends with said chamber, and a filler valve adjacent the opposite end of said air passage.

3. The structure of claim 2 wherein said plunger includes a portion extending externally of said housing, said opposite end of said air passage extending through said extending portion.

4. The structure of claim 2 characterized by and including a positioning finger extending from said control valve and slidable within said air passage in said plunger.

5. The structure of claim 2 characterized by and including a ball member freely movable in said air passage through a path extending in opposite directions from a point of communication of said air passage with said chamber.

6. The structure of claim 1 wherein said gauge comprises a Bourdon tube having one of its ends open to pressure emanating from said plenum chamber and an indicating pointer at its opposite, closed end, and characterized by and including a restricted passage communicating said tube with said plenum chamber.

7. The structure of claim 1 wherein said plunger is slidable in said chamber in an opposite direction in response to pressure in said chamber.

References Cited
UNITED STATES PATENTS

| | | |
|---|---|---|
| 1,297,239 | 3/1919 | Potter. |
| 1,786,103 | 12/1930 | Baird et al. _____ 137—228 |
| 2,539,938 | 1/1951 | Wheeler. |
| 3,249,144 | 5/1966 | Dobrikin _____ 152—415 |
| 3,302,682 | 2/1967 | Berg _____ 152—415 |
| 3,314,440 | 4/1967 | Horowitz _____ 152—415 X |

WILLIAM F. O'DEA, *Primary Examiner.*

D. H. LAMBERT, *Assistant Examiner.*

U.S. Cl. X.R.

152—342